United States Patent
Daimon

(10) Patent No.: US 7,412,485 B2
(45) Date of Patent: Aug. 12, 2008

(54) INFORMATION PROCESSING SYSTEM, INFORMATION PROCESING METHOD, A SOFTWARE PROGRAM FOR EXECUTING SUCH METHOD, AND INFORMATION STORAGE MEDIUM COMPRISING SUCH SOFTWARE PROGRAM

(75) Inventor: Masaaki Daimon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 10/093,819

(22) Filed: Mar. 11, 2002

(65) Prior Publication Data

US 2003/0093477 A1    May 15, 2003

(30) Foreign Application Priority Data

Nov. 15, 2001    (JP)    ............... 2001-350324

(51) Int. Cl.
*G06F 15/16* (2006.01)
(52) U.S. Cl. ...................... 709/206; 709/204
(58) Field of Classification Search ................ 709/217, 709/218, 204, 206
See application file for complete search history.

(56) References Cited

U.S. PATENT DOCUMENTS

| | | | | |
|---|---|---|---|---|
| 5,400,248 | A * | 3/1995 | Chisholm | ............... 705/12 |
| 6,189,029 | B1 * | 2/2001 | Fuerst | ............... 709/217 |
| 6,449,598 | B1 * | 9/2002 | Green et al. | ............... 705/2 |
| 6,684,053 | B2 * | 1/2004 | Helmick et al. | ............... 434/362 |
| 2001/0037234 | A1 * | 11/2001 | Parmasad et al. | ............... 705/12 |
| 2002/0019856 | A1 * | 2/2002 | Bezos et al. | ............... 709/218 |
| 2002/0146674 | A1 * | 10/2002 | Betz et al. | ............... 434/350 |
| 2002/0169664 | A1 * | 11/2002 | Walker et al. | ............... 705/14 |
| 2002/0169841 | A1 * | 11/2002 | Carlson et al. | ............... 709/206 |

FOREIGN PATENT DOCUMENTS

| | | |
|---|---|---|
| JP | 11-306100 | 11/1999 |
| JP | 11-353377 | 12/1999 |
| JP | 2000-49777 | 2/2000 |
| JP | 2001-290925 | 10/2001 |
| JP | 2002-288387 | 10/2002 |

OTHER PUBLICATIONS

Japanese Office Action corresponding to JP Application No. 2001-350324, dated Aug. 29, 2006.

* cited by examiner

*Primary Examiner*—Larry D. Donaghue
*Assistant Examiner*—Asghar Bilgrami
(74) *Attorney, Agent, or Firm*—Staas & Halsey LLP

(57) ABSTRACT

According to the present invention, a server computer discloses content data to client terminals used by predetermined members within a company or a division through groupware. The content data needs to be examined by the predetermined members. The server computer periodically collects feedback of the examination for the content data from the predetermined members, compares the collected examination feedback with a predetermined examination requirement, and when the collected examination feedback meets the predetermined examination requirement, transfers the content data to a Web server to disclose the content data to user terminals other than the client terminals used by the predetermined members.

26 Claims, 7 Drawing Sheets

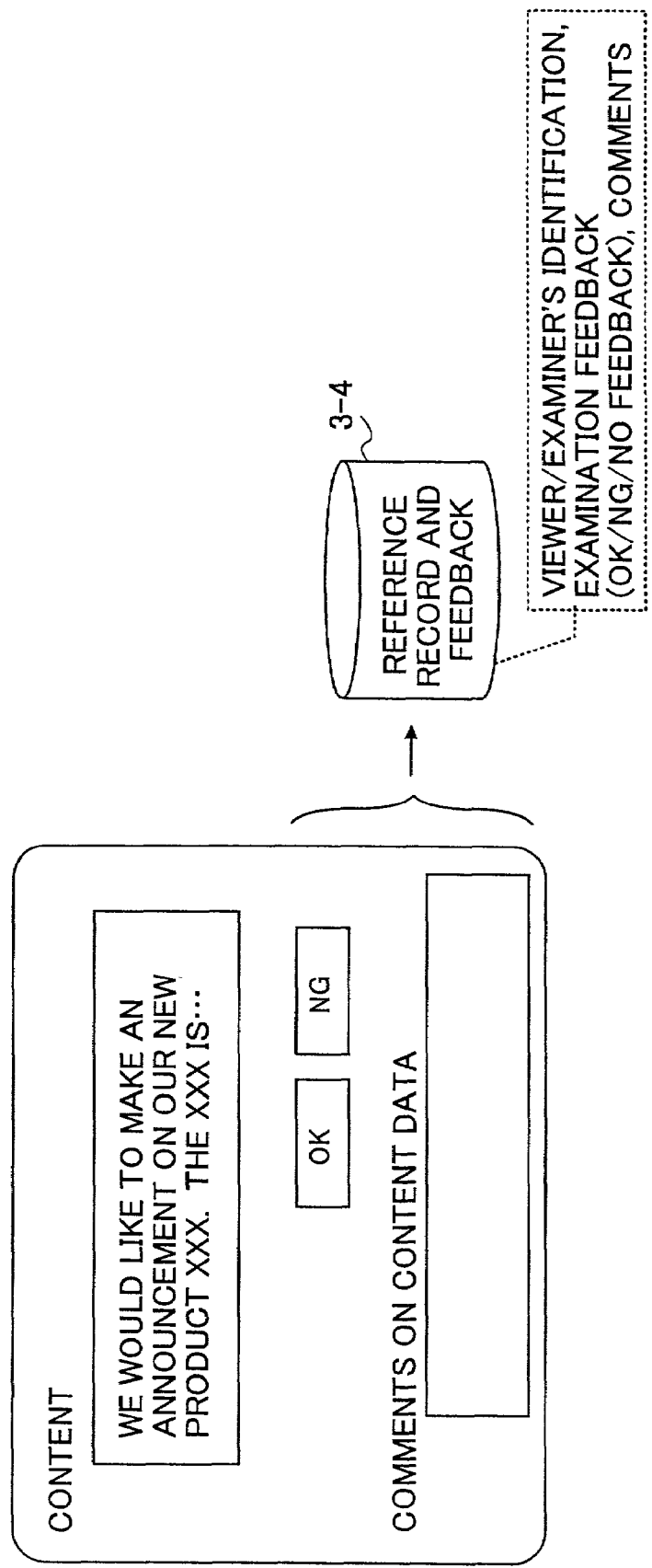

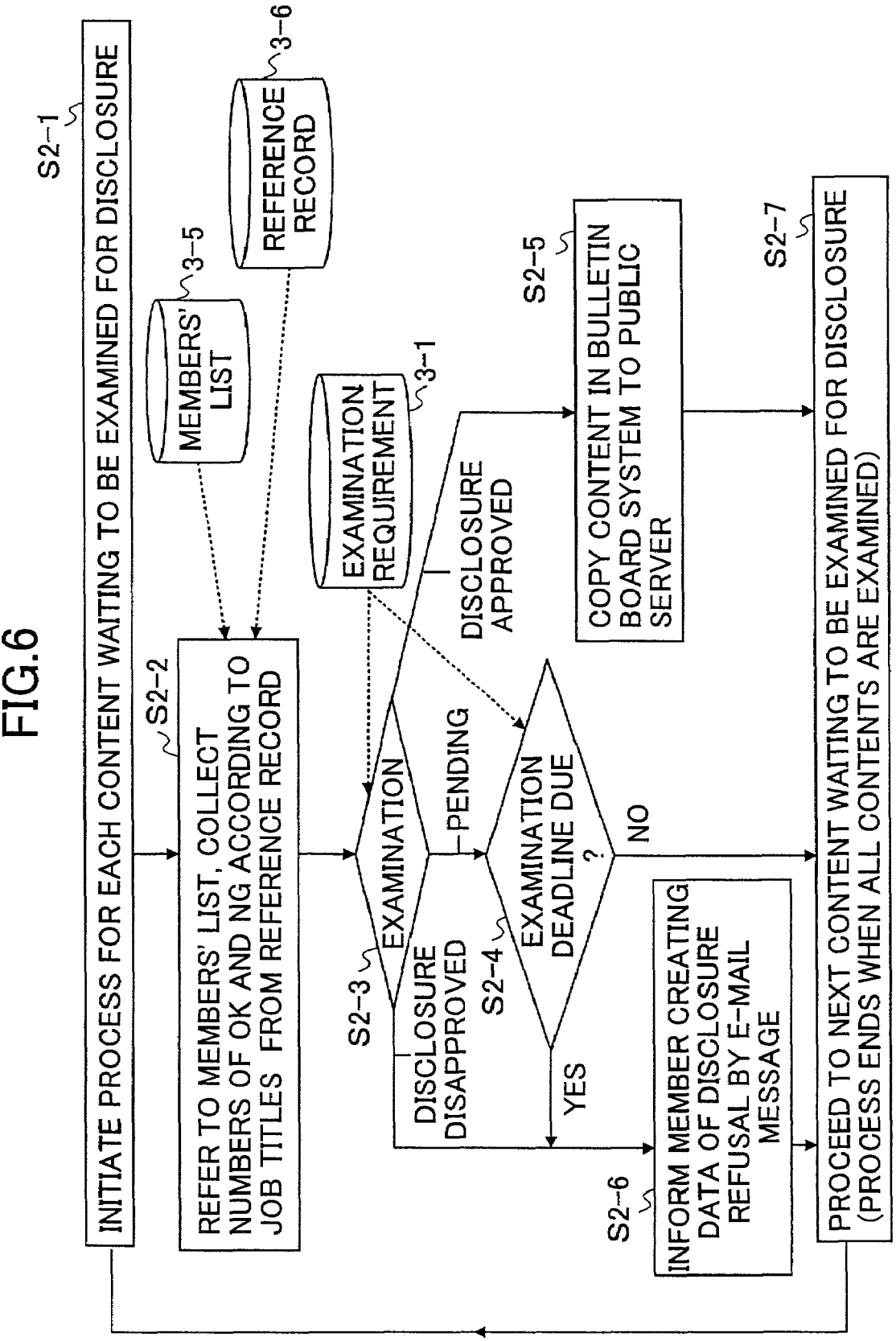

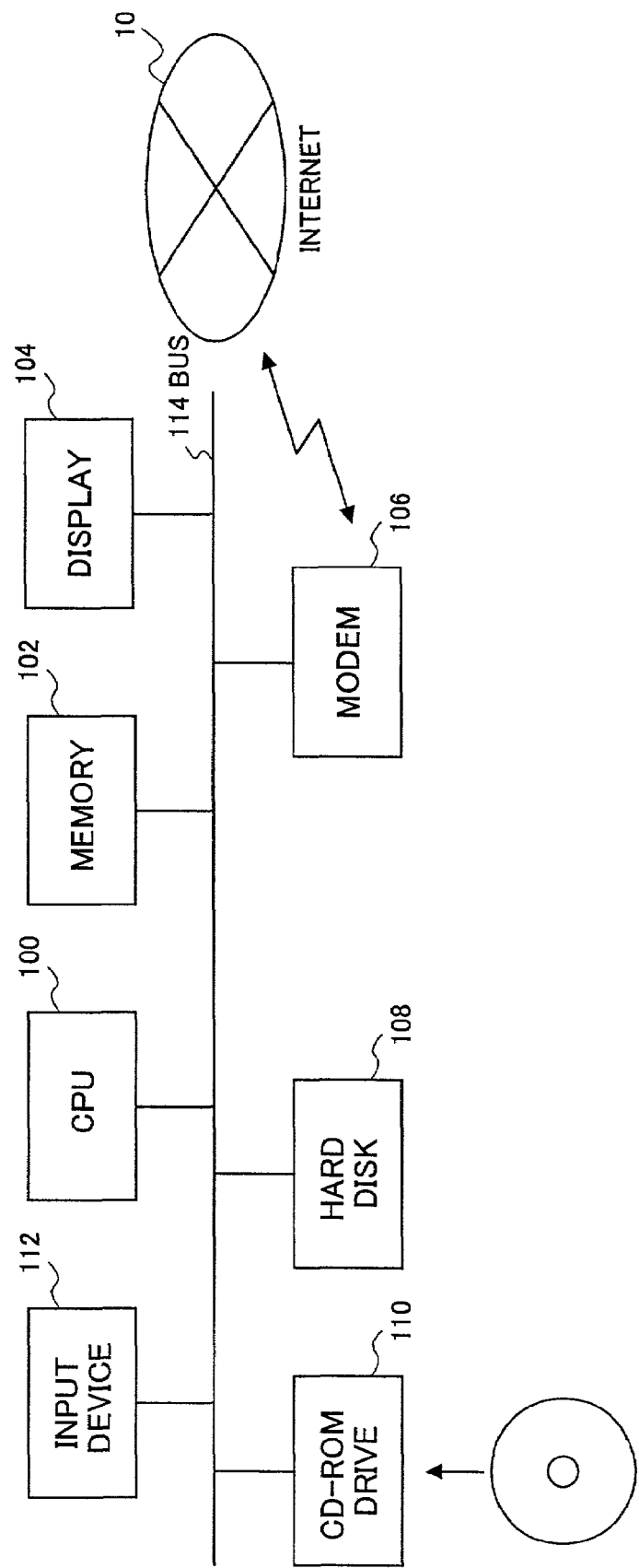

INFORMATION PROCESSING SYSTEM, INFORMATION PROCESING METHOD, A SOFTWARE PROGRAM FOR EXECUTING SUCH METHOD, AND INFORMATION STORAGE MEDIUM COMPRISING SUCH SOFTWARE PROGRAM

BACKGROUND OF THE INVENTION

1. Field of the Invention

The present invention generally relates to an information processing system, an information processing method, a software program for carrying out the information method, and an information storage medium comprising such software program.

More specifically, the present invention relates to an information processing system, an information processing method, a software program for carrying out the information method, and an information storage medium comprising such software program, which effectively shorten the time needed for examining the information to be disclosed through an electronic Bulletin Board System, etc., in particular, on the Web (World Wide Web) pages.

2. Description of the Related Art

It has become popular for various organizations such as business enterprises and research institutes, etc., with the recent increasing usage of the Internet, to utilize Web pages, etc. in order to disclose their activities, etc. to the public as a part of information disclosure. However, the wide usage of the Internet, at the same time, provides a possibility for the public to view the disclosed information, and thus it is necessary to pay attention to the contents of the information to be disclosed. In other words, it is necessary to obviate the problems such as an accidental leakage of company confidential information or a deterioration of the brand image of the company due to the typographical errors, the accidental omissions of letters and the like included in the disclosed information.

In order to solve such problems, the information to be disclosed needs examination in advance. As one of such techniques, for example, Japanese Laid-Open Patent Application Number 11-306100 discloses "Posted Messages Viewing Systems". The system prepares examination criterion data beforehand, and puts up in the viewing database only the posted message data that are considered allowable, as general-user viewable information, through the examination process using the examination criterion data. The examination process comprises a "primary level" for general examiners and a "secondary level" for experienced examiners, and the process is configured to proceed to the "secondary level" when the examination in the "primary level" is indecisive due to the lesser experience of the examiners, etc.

In such systems, however, the examination criterion data needs to be created previously and the examination quality is influenced by the validity of the data. That is to say, if the examination criterion data were biased, the examined posted messages would be inevitably biased as well. Therefore, a quality examination process may not be always provided. Further, the posted data are not disclosed until they have gone through the predetermined examination process, thus the disclosure may be delayed due the reasons such as absence of the examiners and the like.

Also, Japanese Laid-Open Patent Application Number 2000-49777 discloses "Electronic Bulletin Board Systems and Storage Medium used therein", in such a system, category information is added, by examiners, to each of the miscellaneous posted messages from the public, allowing an user-friendly way of surfing the Web pages by presenting them in categories based on the category information. The system includes functions such as automatically extracting broadcast-prohibited terms at the time of adding the category information to the posted messages. However, in such a system, the disclosure may also be delayed as a result of a possible delayed categorizing process due to the reasons such as absence of the particular examiners.

Additionally, Japanese Laid-Open Patent Application Number 11-253377 discloses "Public Information Transmitting Methods". Such method, when transmitting public information such as various news, etc. through an electronic bulletin board system, is configured to put up articles from reliable particular users without examination, but to examine previously, by particular examiners (users), articles from users besides the reliable particular users.

In such method, since the articles from the particular users are unexamined, broadcast-prohibited terms, for example, may not be checked and problems such as typographical errors and accidental omissions of letters may arise due to careless mistakes. In addition to that, since the articles from the users besides the particular users need to be examined by the particular examiners (users), the disclosure of such articles may also be delayed due to the reasons such as absence of such particular examiners and the like.

Also, it is possible to conceive such a system in which, when examining the information such as documents etc. to be disclosed to the public, requesting for a full approval from relevant members of a company, etc., for example, using groupware and the like in a company. In case of such a system, since full approval of the relevant members is required, when one of the members is missing due to the absence, etc., as mentioned above, the resolution is delayed, which could also lead to the delay in disclosure.

Therefore, according to the related art, there is a possibility that the disclosure of the information is delayed when, in particular, the examiners to check the information to be disclosed are absent, for example.

SUMMARY OF THE INVENTION

An object of the present invention is to provide an information disclosure system that may solve the problems according to the related art.

In order to achieve the above object, the present invention has the following configuration.

The present invention is configured as;

disclosing content data to terminals used by predetermined members, the content data to be examined by the predetermined members;

collecting feedback of the examination for the content data from the predetermined members;

comparing the collected examination feedback with a predetermined examination requirement (disclosure requirement); and disclosing the content data to user terminals other than the terminals used by the predetermined members, in the case of the collected examination feedback meets the predetermined examination requirement.

By configuring as described above, the content data to be disclosed to the public are disclosed in-house and in-division of an organization through a known groupware function, etc., and the members viewing the content data examine the content data and input the examination feedback to the terminals on which the content data are displayed. The input examination feedback is collected independently according to job titles/status of the members. In the case that collected feedback meets the predetermined examination requirement (disclosure requirement), the relevant content data are automatically transferred to a server for public disclosure and disclosed to the public by the Web (World Wide Web) pages, etc.

Therefore, viewers or examiners to examine the content data are unspecified numbers of persons or employees in a company or a division, and since they are not fixed members, even when a particular member of the viewers or the examiners is absent and is unable to view and examine the content data, as long as the collected examination feedback clears or satisfies the predetermined examination requirement (disclosure requirement), the relevant content data can be made public. Therefore, a faster disclosure of the content data is possible without a delay in the examination process, while securing the quality of the examination.

Also, the examination requirement (disclosure requirement) may be configured as selectable, depending on the contents of the relevant content data, from a plurality of examination requirements previously determined by an administrator of a system.

As a result, the degree of freedom related to the examination requirement (disclosure requirement) is improved, as well as a user created the content data may be free of a troublesome work, and thus an effective way of setting the examination requirement for public disclosure is provided.

Further, the collected examination feedback may be independently collected according to the job titles/status of the members, among the viewers or the examiners, approved or disapproved of the relevant content data.

By configuring in this way, an examination method is simplified and thus both a faster examination by the viewers or the examiners and a faster collection of the examination feedback may be possible. As a result, a faster disclosure of the content data is realized.

Additionally, an examination deadline is predetermined and the examination feedback is collected periodically. In the case that the collected examination feedback does not meet the examination requirement (disclosure requirement) even when the examination deadline comes due, the present invention may be configured to send back the relevant content data as a disclosure rejection to the user creating the content data (the registrant or the person claimed for examination, etc.).

By configuring as described above, since the examination feedback is collected periodically, a real time check of the examination feedback is always possible, and the user who created the content data may hold the examination feedback at any time and ready to correct the content data accordingly in a case when the disclosure of the relevant content data is rejected.

Also, a disclosure destination to which the relevant content data is disclosed and/or a level of importance of the relevant content data are selectable from a plurality of predetermined disclosure destinations and/or levels of importance, and the examination requirement may be automatically determined according to the selected disclosure destination and the selected level of importance.

By configuring as mentioned above, the degree of freedom of the information processing system according to the present invention for information disclosure and examination for the information is improved, along with the work necessary for determining the disclosure destination of the content data and/or for determining the level of importance and the examination requirement for the content data by the user creating the content data is simplified. Thus, the entire process necessary before the information disclosure is effectively shortened.

According to the present invention, when disclosing the content data to the public (i.e. disclosing the content data to the user terminals besides the terminals of the predetermined members), an approval of disclosure of the relevant content data is determined by the collected examination feedback that is sent from an unspecified number of viewers or examiners within the predetermined members. Therefore, a delay in examination of the relevant content data due to absence of particular examiners, etc. is precluded and also a delay in the disclosure of the content data is effectively avoided. Further, since the disclosure destinations and the levels of importance of the relevant content data are selectable at random, it is possible to select and determine the disclosure destination and the level of importance accordingly depending on the contents of the relevant content data, in view of the examination quality and the time needed for examination. Therefore the degree of freedom of practicing the present invention increases and an ease of use is improved.

Further, since the present invention periodically monitors the current viewing and examination situation, for example, on the number of the examination feedbacks sent from the some of the predetermined members, the user who created the content data, etc. is able to check the situation on the examination feedback at any time and therefore ready to possibly correct the content data accordingly in a case when the disclosure of the relevant content data is rejected.

It is noted that the term "predetermined members" used herein, throughout the specification and the claims of the present application, implies users belonging to a certain kind of group, such as a groupware, however, the relevant users may not be or do not need to be provided with any particular examination authority. In short, the relevant users are general-users in the group.

Thus, the present invention has an advantage of promoting the examination process by configuring as to enable anyone belonging to the predetermined group may participate in the examination process.

BRIEF DESCRIPTION OF THE DRAWINGS

Other objects, advantages, and further features of the present invention will become more apparent as the description proceeds taken in conjunction with the accompanying drawings which:

FIG. 5 shows an example of a screen for viewing the content data and writing examination feedback for a in-house use while carrying out the viewing examination operations for disclosure as shown in FIG. 2;

FIG. 6 is a flow chart of an automated examination feedback collection process operation while carrying out the viewing examination operations for disclosure as shown in FIG. 2; and FIG. 7 is a block diagram of a computer on which a computer program according to the present invention is carried out.

DETAILED DESCRIPTION OF THE PREFERRED EMBODIMENT

The following is a description of embodiments of the present invention, with reference to the accompanying drawings.

Figure 1:
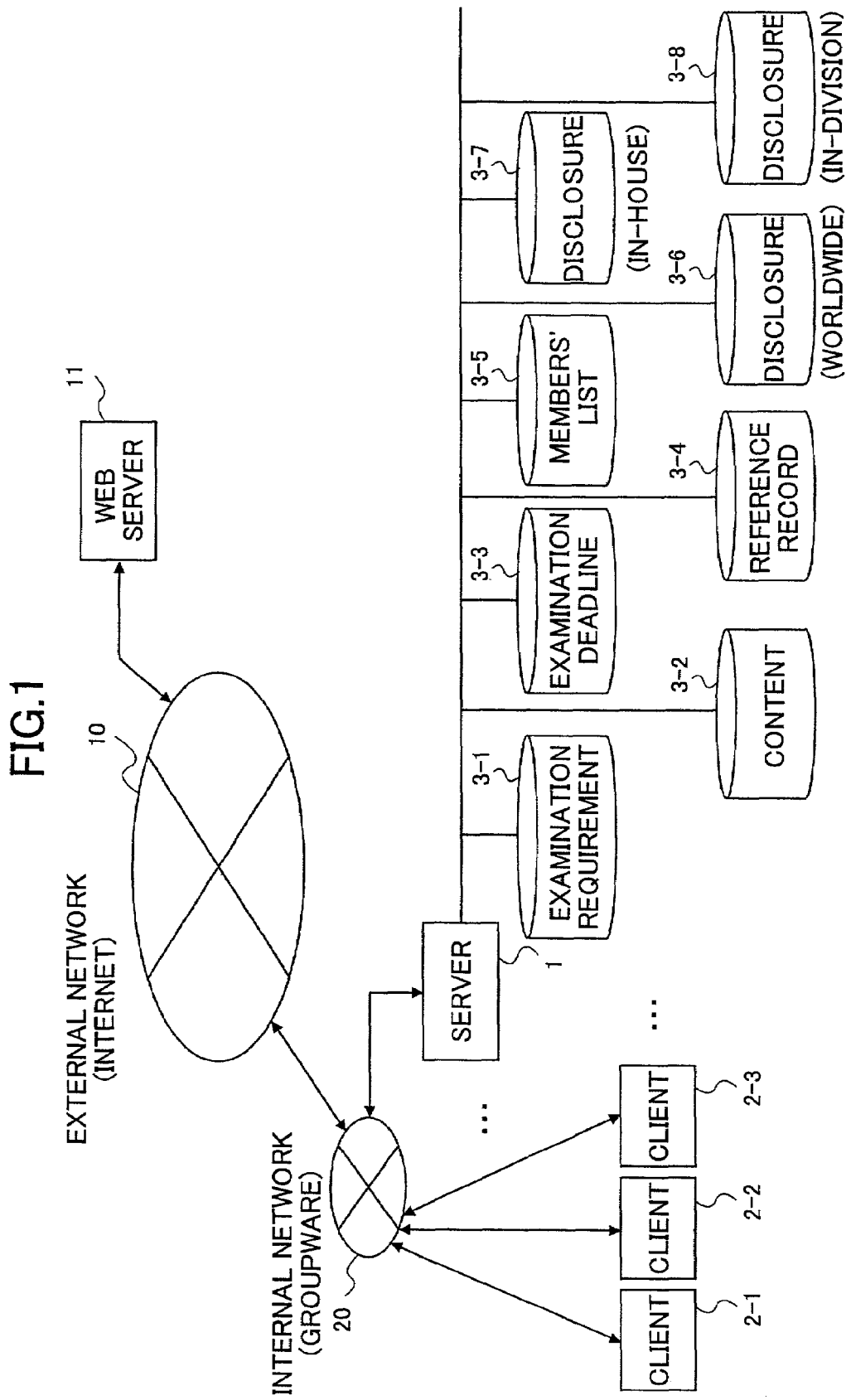
FIG. 1 shows a schematic configuration of an information processing system in one embodiment of the present invention.

FIG. 1 shows a schematic configuration of an information processing system in one embodiment of the present invention. As shown, the information processing system according to the present invention comprises an external network 10, such as the Internet, etc., which enables a worldwide communication between a plurality of computers, an internal network 20 (LAN, etc.) configuring groupware, etc. in organizations such as particular business enterprises, etc., a plurality of client computers 2-1, 2-2, 2-3, . . . , 2-n (for example, each comprises a personal computer) connected to the internal network 20, and a server computer 1 (which comprises a workstation, etc.) which is also connected to the internal network 20.

It is noted that, herein, the server computer is not limited to one but a plurality of server computers may be used.

Also, a plurality of members may share each client computer. In such a case, it is possible to identify a user currently using the client computer (terminal) by his/her user name used when the user logs in on the client computer or when he/she logs in on groupware in the organizations.

It is to be understood herein that each client computer 2-1, 2-2, 2-3, . . . and the server computer 1 are interconnected by the internal network 20 and constitute, for example, in-house groupware in the organization.

Also, in the information processing system according to the present invention, the server computer 1 has, as shown, an examination requirement database 3-1, a content folder 3-2, an examination deadline file 3-3, a reference record file 3-4, a members' list database 3-5, and disclosure information folders 3-6, 3-7, and 3-8, etc. (in particular, they are stored on a hard disk, etc.).

In the information processing system according to the present invention, the following operations are carried out by a groupware function of the server computer 1.

The information to be disclosed to the public through a Web page of the company using the in-house groupware, is input (posted) as electronic information (such as electronic documents) through each of the client computer 2-1, 2-2, 2-3, . . . , and the input information is stored in the content folder 3-2. The input information (disclosure contents) stored in the content folder 3-2 is disclosed to the employees, etc. of the relevant company (exclusive members or all the members of the company) through an electronic bulletin board system, as one function of the groupware in the company.

Then, the disclosed information is examined by the members (employees of the company, etc.). The members input their comments on the examined disclosed information (as examination feedback), such as approval (OK) or disapproval (NG), etc., through their individual client computers 2-n. The examination feedback from the members of the company is transferred to the server computer 1 via the groupware, and is stored in the reference record file 3-4, each examination feedback collected independently, as a number of persons, according to job titles/status of the members, input the examination feedback.

Further, the server computer 1 in the system according to the present invention periodically (every 1 minute, every 10 minutes, etc.) compares and collates the examination feedback stored in the reference record file 3-4 with a predetermined examination requirement (disclosure requirement) stored in the examination requirement database 3-1. The server computer 1 determines whether or not the examination feedback meets the predetermined examination requirement stored in the examination requirements database 3-1.

In the case of the server computer 1 decides that the examination feedback meets the predetermined examination requirement, the input information is approved of disclosure. The server computer 1 then transfers the relevant input information to the disclosure information folders 3-6, 3-7, or 3-8 corresponding to disclosure destinations of the relevant input information, according to the contents of the input information stored in the content folder 3-2. The information (contents) to be disclosed stored in each of the disclosure information folders 3-6, 3-7, and 3-8 is transferred appropriately, for example, to the external network 10, via the internal network 20 by an information transfer program function preinstalled in the server computer 1, and also the information to be disclosed is transferred to a Web server 11 and stored therein.

The information to be disclosed stored in the Web server 11 as described above is accessible by a function of Web browsing software of user-terminals connected worldwide to the external network 10 and the information is disclosed as Web page information.

Arts used for writing/posting messages in the electronic bulletin board systems in the groupware of the companies and for displaying the messages therein, and also arts used for displaying the Web pages on the Internet are well-known by those who practice the respective arts, therefore, further descriptions related to the arts will not be given.

In the case of the examination feedback does not meet the predetermined examination requirements stored in the examination requirement database 3-1, as a result of periodically referring to the reference record file 3-4 as mentioned above, the server computer 1 continues the in-house disclosure of the relevant information for examination. Further, in the case of the deadline stored in the examination deadline file 3-4 being due, the relevant information is determined as being disapproved for disclosure (disclosure rejection) and is sent back to the employee who created the information (member, registrant, or a person claimed for the examination, etc.).

Figure 2:
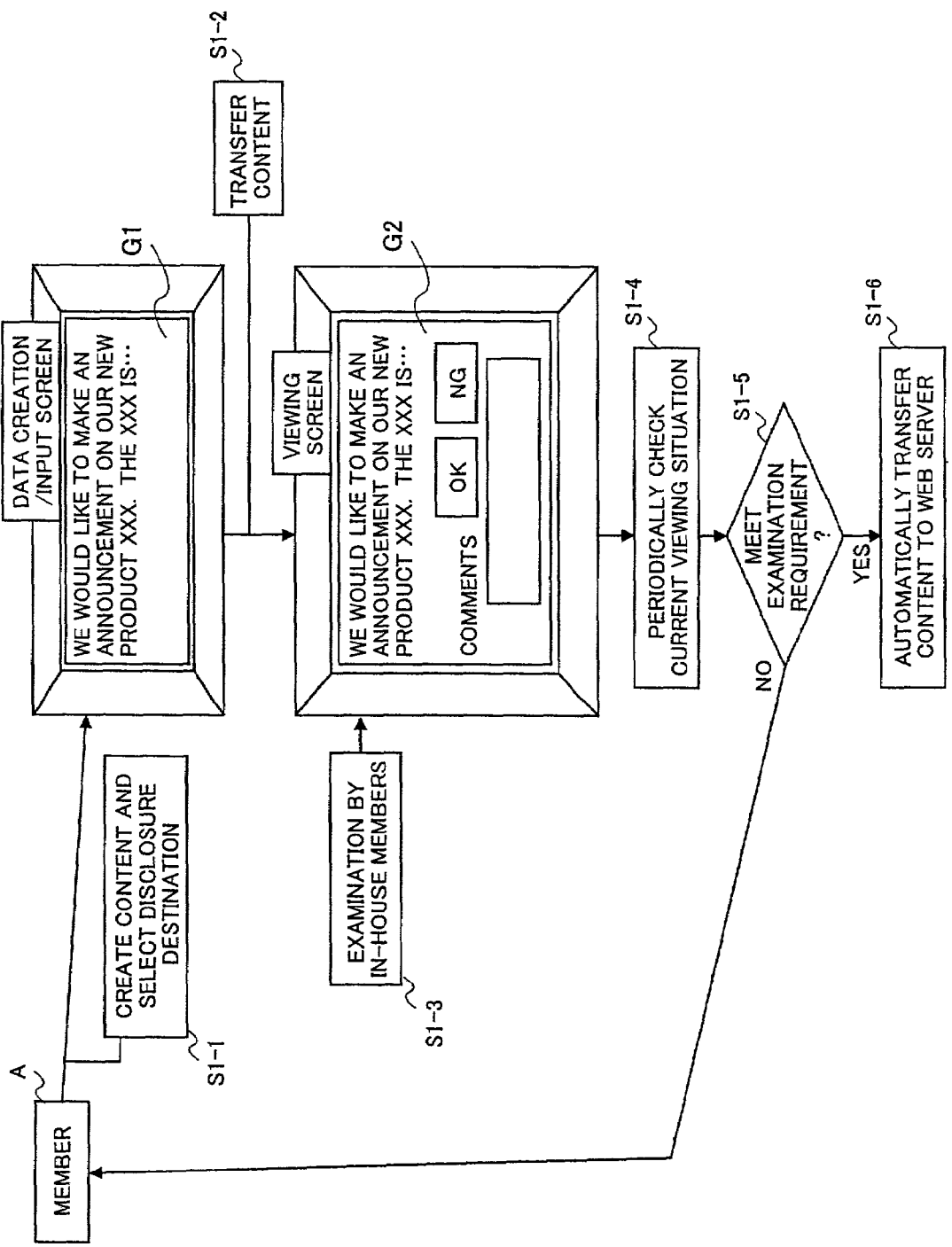
FIG. 2 is a flow chart of viewing examination operations for disclosure carried out by a server computer of the information processing system in FIG. 1.

The above-mentioned operations are illustrated in a flow chart shown in FIG. 2.

Referring to FIG. 2, in step S1-1, a member A of the company, etc. creates document information (contents such as a text, etc.) G1 to be disclosed to the public on his/her terminal (one of the client computers 2-n). Then, in step S1-2, the member A transfers the document information G1 created on his/her terminal to the server computer 1 (posting operation). As a result, a viewing screen G2 is generated by the electronic bulletin board system function, etc. of the groupware in the company, and the viewing screen is made viewable to predetermined members (employees, etc.) of the company through their respective terminals (client computers 2-n) according to the electronic bulletin board system function. In step S1-3, each member viewing the viewing screen examines the contents of the document information thus displayed on the screen and clicks "OK" button on the screen if he/she considers the contents of the document information displayed is approved, or "NG" button on the screen if he/she considers the contents of the document information is disapproved. In the case of disapproval, some of the predetermined members of the company who disapprove of the document information also write in their comments on the contents of the document information (such as indications for correction and suggestions for improvement), if necessary, in a comment field provided on the same viewing screen and send their comments to the server computer 1.

In step S1-4, the current viewing situation (the current reference situation of examination feedback sent from some of the predetermined members, more specifically, the situation on the collective number of persons already making reference to or viewing the viewing screen and the situation on the number of OKs and the number of NGs, etc. The number of the persons already making reference to or viewing the viewing screen may be grouped separately according to their job titles/status) is monitored periodically by the electronic bulletin system function. As a result of which, in the case that the current viewing situation meets the predetermined examination requirement stored in the examination requirement database 3-1, the document information created by the member A is transferred to the disclosure information folders (3-6, 3-7, or 3-8) for disclosure through the Web (step S1-5 "YES").

In the case that the current viewing situation does not meet the predetermined examination requirement stored in the examination requirement database 3-1 and therefore the document information created by the member A is disapproved for disclosure, a notice comprising a disclosure rejection and the examination feedback (such as the job titles of viewers and examiners, the numbers of OKs and NGs, and comments, etc.) may be sent to the terminal of the member A (by e-mail messages, etc.) (step S1-5 "NO"). The operations are returned to step S1-1 and the member A reviews the comments such as suggestions for corrections, etc. from the viewers and the examiners on the document information included in the examination feedback, corrects the document information accordingly, and then goes over the same posting operation (step S1-2) again, which means the member A sends a revised version of the document information to the server computer 1. Following thereto, the revised version of the document information sent to the server computer 1 undergoes the same viewing and examination operations (step S1-3 and step S1-4), and the examination feedback, including the collective number of the persons who made reference to the viewing screen and the decision whether the revised document information is approved of or disapproved of for disclosure, is provided for the revised document information (step S1-5).

The following are illustrative examples of the above-mentioned examination requirements.

(1) For (English) contents to be disclosed worldwide (ex.: a new product release in English).

Approval requirement: equal to or more than 10 persons should approve of the disclosure (OKs) and nobody disapproves of the disclosure (NGs) from the executives.

(2) For (Japanese) contents to be disclosed worldwide (ex.: a new product release in Japanese).

Approval requirement: equal to or more than 10 persons should approve of the disclosure (OKs) and no more than 1 person disapproves of the disclosure (NGs) from those at the upper level of managerial class.

(3) For in-house contents (ex.: general scheduling information on a new product release).

Approval requirement: less than 5 persons disapprove of the disclosure (NGs).

(4) For contents to be disclosed within a division (ex.: general information on changes in the room layout).

Approval requirement: no approval is needed and the contents are promptly disclosed to all the members of the division.

It is noted that other examples, besides the illustrative examples listed above, in which the member created the document information to be disclosed may directly designate a level of importance of the document information at the time of inputting the information, is also possible.

In other words, the following example may be possible.

(1) Most important contents (ex.: a new product release in English).

Approval requirement: equal to or more than 10 persons should approve of the disclosure (OKs) and nobody disapproves of the disclosure (NGs) from the executives.

(2) Very important contents (ex.: a new product release in Japanese).

Approval requirement: equal to or more than 10 persons should approve of the disclosure (OKs) and no more than 1 person disapproves of the disclosure (NGs) from those at the upper level of managerial class.

(3) Important contents (ex.: general scheduling information on a new product release).

Approval requirement: less than 5 persons should disapprove of the disclosure (NGs).

(4) General contents (ex.: general information on changes in the room layout).

Approval requirement: no approval is needed and the contents are promptly disclosed to all the members of the division.

It is noted that in the above-mentioned example, a disclosure destination of the contents may be designated independently of the level of importance of the contents. In short, even in the case where the contents are to be disclosed "worldwide" (i.e. the disclosure destination is "worldwide"), but its level of importance may be low, it is possible to designate the relevant contents as "(3) Important contents" or "Approval requirement: less than 5 persons disapprove of the disclosure (NGs)".

By configuring as mentioned above according to the present invention, particularly the work needed to select special examiners for examining the contents before the disclosure of the contents can be eliminated, and also the time needed for examining the contents can be effectively shortened without reducing the examination quality, therefore, a faster information disclosure is realized.

Figure 3:
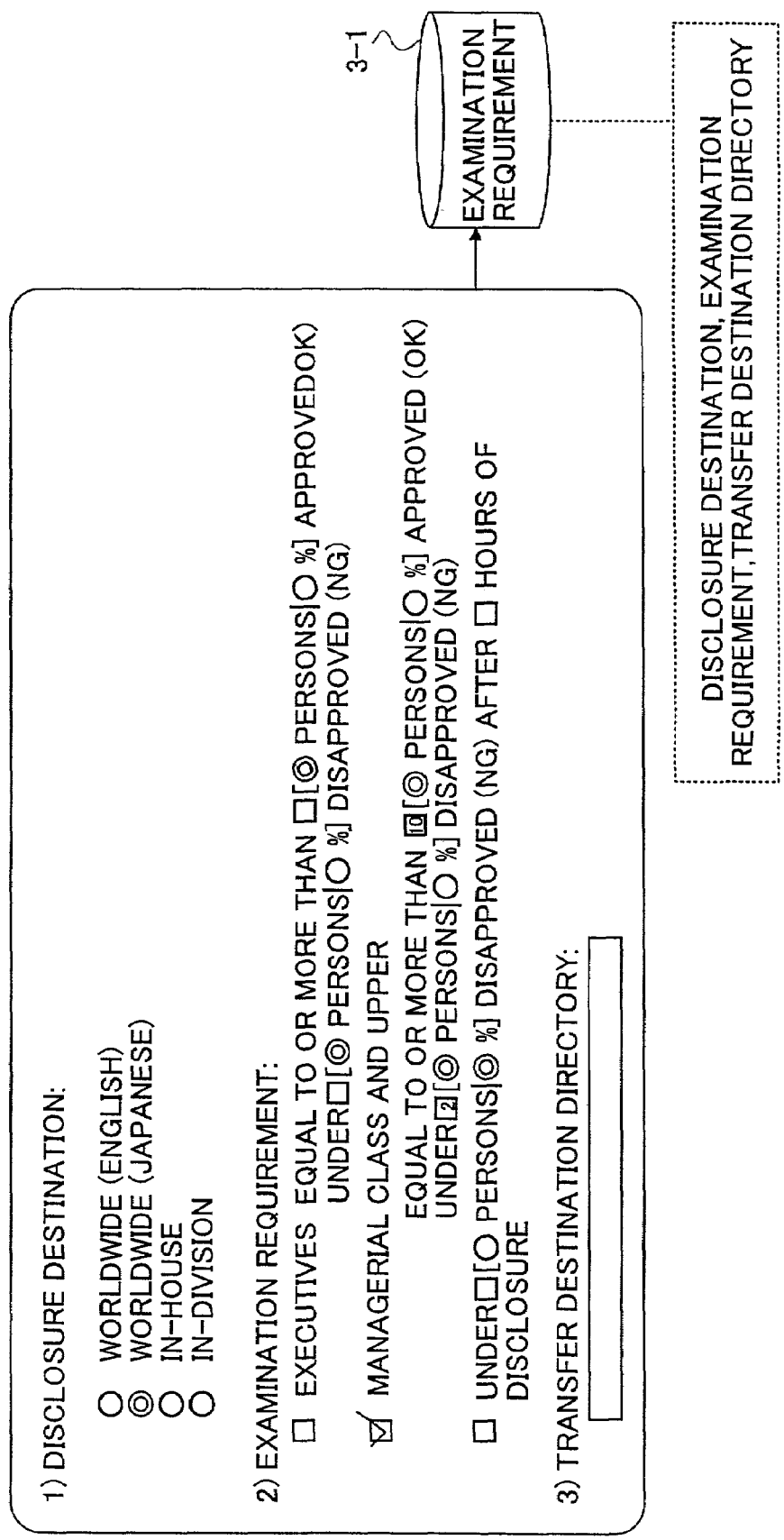
FIG. 3 shows an example of a screen in which information disclosure destination and examination requirement setting is executed by an administrator of the system before carrying out the viewing examination operations for disclosure as shown in FIG. 2.

FIG. 3 is a diagram of assistance in describing an embodiment of a screen for setting the information disclosure destinations and the examination requirement (by administrators of the system of the present invention) before the disclosure of the contents (an administrator function).

This screen is displayed only on the terminals (client computers 2-n) of the administrators of a special department responsible for the in-house groupware and is used for setting the disclosure destinations, the examination requirement, etc. for the contents to be disclosed to the public.

More specifically, first referring to item 1) in the screen, a disclosure destination to which the following examination requirement should be set for is selected. In FIG. 3, the disclosure destination is set for "worldwide (in Japanese)" and is indicated by a double circle.

Then, at item 2) in the screen, an approval requirement (an examination requirement) related to the disclosure destination selected in the item 1) is to be decided. In FIG. 3, the examination requirement "equal to or more than 10 persons approved (OKs) and less than 2 persons disapproved (NGs) from those at upper level of managerial class" is determined. (Also, as shown in the figure, a use of percentage (%) is possible instead of "the numbers of the persons" when deciding the examination requirements).

Last, at item 3) in the screen, a transfer destination directory is to be input. In the present embodiment, the disclosure destination is worldwide, and thus, among the disclosure information folders 3-6, 3-7, and 3-8, the disclosure information folder 3-6 which contains a program of transferring the contents to the Web server 11 is designated.

For other disclosure destinations, the approval requirement and the transfer destination directories are decided and input, respectively, in a similar way as mentioned above.

These designated and selected disclosure destinations and the examination requirements are stored in the examination requirement database 3-1.

It is noted that in the case where "in-house" is designated at the item 1), an in-house disclosure folder 3-7 is to be input for the transfer destination directory in the item 3), and in the case where "in-division" is designated at the item 1), an in-division disclosure folder 3-8 is to be input for the transfer destination directory in the item 3). The contents stored in the in-house disclosure folder 3-7 and the in-division disclosure folder 3-8 are made viewable to everyone within the entire company or only on the terminals (client computers 2-n) of the members of the predetermined division, respectively, through the electronic bulletin board system function of the groupware in the company.

Figure 4:
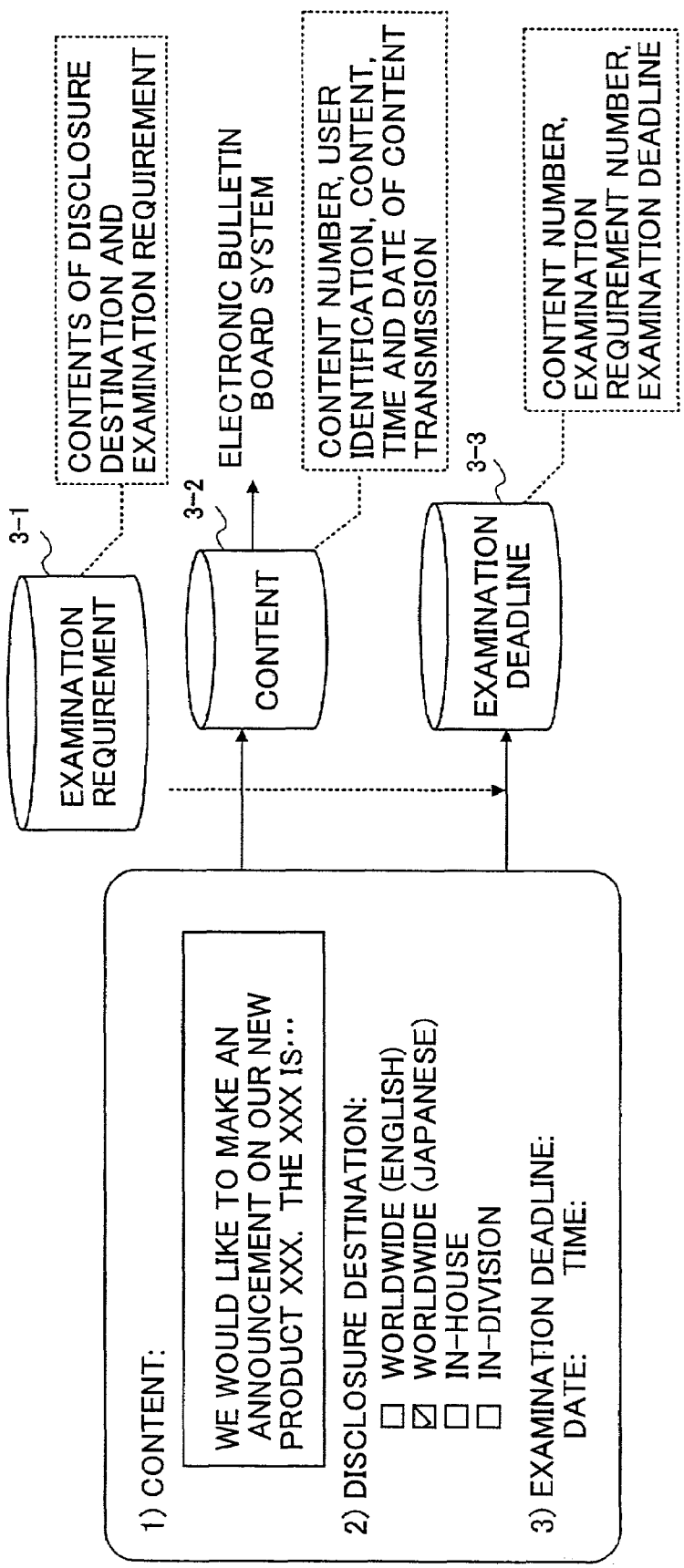
FIG. 4 shows an example of a screen in which a member creates content data, and specifies the information disclosure destination and an examination deadline while carrying out the viewing examination operations for disclosure as shown in FIG. 2.

FIG. 4 shows an illustrative example of a screen for creating input information (disclosure contents).

The member A of the company first creates contents to be disclosed in item 1) by word processor inputs, etc.

Then, in item 2), the member A designates the destination to which the contents should be disclosed.

Further, in item 3), the member A specifies the examination deadline.

Thus input content information is stored in the content folder 3-2 shown in FIG. 1 along with identification information of the member A and posting date/time information. An OK button, an NG button, and a comment field are added to the content information stored in the content folder 3-2 to generate the viewing screen G2 as shown in FIG. 2, and the viewing screen is made viewable, as the electronic bulletin board system information, etc., to the predetermined members of the company.

For the disclosure destination information selected in the item 2), a reference is made to the examination requirement determined previously and stored in the examination requirement database 3-1 in FIG. 3 and a number representing the examination requirement relevant to the selected disclosure destination is read out from the database 3-1. The number representing the examination requirement and a number representing the relevant contents are both stored in the examination deadline file 3-3.

The examination deadline information specified in the item 3) is stored in the examination deadline file 3-3 along with the number representing the examination requirement and the number representing the relevant contents.

FIG. 5 shows an illustrative example of a screen for in-house disclosure and viewing (as shown in FIG. 2 as the viewing screen G2 ) and a diagram for describing reference feedback in the reference record file 3-4.

As shown, the examination feedback input by the viewers (the members of the company making reference to the viewing screen) (such as OK or NG, and the comments, etc. in the case of NG) is transferred to the reference feedback (record) file 3-4 along with identification information of the viewers and stored therein.

FIG. 6 shows an operational flow chart of an automated examination feedback collection process carried out by the server computer 1 according to the present invention.

As shown, in step S2-1, the automated examination feedback collection process is initiated periodically (every 1 minute, every 10 minutes, and so on) for each content created by the member A of the company, transferred, and stored in the content folder 3-2, waiting to be examined for disclosure.

In step S2-2, by making reference to a members' list (identification information, names, e-mail addresses job titles/status (such as executives/managers/regular employees/. . . , etc.) of the in-house and in-division members) stored in the members' list database 3-5, collect the numbers of OKs and NGs, each collected independently according to the job titles of the members/viewers/examiners, from the reference record/feedback related to the relevant contents stored in the reference record file 3-4.

In step S2-3, information on the examination requirement, the disclosure destination, and the level of importance of the contents, selected and stored as described in FIG. 3 and FIG. 4, are read out from the examination requirement database 3-1, the content folder 3-2, and the examination deadline file 3-3, so as to obtain the examination requirements information of the relevant contents and decide if the collected feedback in step S2-2 meets the examination requirement of the relevant contents.

In the case of the collected feedback meets the examination requirement of the relevant contents (for example, in the case of the example shown in FIG. 3 and FIG. 4, equal to or more than 10 persons have approved of the contents (OK) and less than 2 persons have disapproved of the contents (NG) from those at upper level of managerial class), the process proceeds to step S2-5 and the relevant contents are transferred to one of the disclosure information folders (in the present example, the relevant contents are transferred to the disclosure information folder 3-6 which contains a program for transferring the contents to the Web server 11) and stored therein.

In step S2-7, the automatic examination feedback collection process is returned to the beginning and the process starts a new run for the next content waiting to be examined for the public disclosure.

In the case that the collected feedback does not meet the examination requirement of the relevant contents yet but is likely to meet the examination requirement (which means, in the same example provided above, less than 10 persons have approved of the contents (OKs) and less than 2 persons have disapproved of the contents (NGs). This shows that with a little more time, the number of the approvals may go up to or go beyond 10), the process proceeds to step S2-4, wherein the examination deadline information specified to the relevant contents are read out from the examination deadline file 3-3. The read-out examination deadline is compared with the current time and date as to decide if the examination deadline came due. In the case of the examination deadline is not yet due, the process proceeds to step S2-7.

In the case of the examination deadline is due, the process proceeds to step S2-6 in which an e-mail message is sent to the member A created the relevant contents informing him/her that the relevant contents are "disclosure rejected" (sendback operation).

Also, in step S2-3, in the case of the collected feedback does not already satisfy the examination requirement of the relevant contents (in the case of the same example as provided above, more than 2 persons have already disapproved of the contents (NG)), the process proceeds directly to step S2-6.

By referring to FIG. 7, it is to be noted that the operations of the present invention carried out by the server computer 1 may be configured so as to be realized by, first having predetermined commands written on a transportable information storage medium (such as CD-ROMs, etc.) previously, as a software program, second having the transportable information storage medium loaded in a predetermined drive 110 of a personal computer or a workstation functioning as the server computer 1 and read out therein, third having the predetermined commands written on a hard disk 108, etc. of the computer, fourth having the predetermined commands written on the hard disk, etc. read out and written on a RAM 102, etc., and lastly having the predetermined commands written on the RAM 102 executed by a CPU 100.

Having described the present invention as related to the embodiments shown in the accompanying drawings, it is intended that the invention not be limited by any of the details of description, unless otherwise specified, but rather be construed broadly within its sprit and scope as set out in the accompanying claims.

The present application is based on Japanese priority application No. 2001-350324, filed on Nov. 15, 2001, the entire contents of which are hereby incorporated by reference.

What is claimed is:

1. A system for approving and disclosing contents created by a user of an internal network to an external network, comprising:
    a distributing part distributing the content, via the internal network, to a predetermined group of members, the members tasked with examining the content and determining whether the content should be approved for disclosure;
    a collecting part collecting approval feedback from an unspecified number of the predetermined group of members as to whether the members approve or disapprove of the content to be disclosed;
    a comparing part comparing the collected approval feedback with a predetermined approval requirement; and
    a disclosing part disclosing the content to the external network if the collected approval feedback meets the predetermined approval requirement, wherein
    an approval deadline by which the approval requirement must be met is predetermined, and
    in a case that the approval feedback does not meet the approval requirement when the approval deadline comes due, the content is sent back to the user who created the content, a registrant, or a person tasked with approving the content as being disapproved for disclosure to the external network.

2. The system as claimed in claim 1, wherein:
    the predetermined approval requirement is configured as selectable, depending on the content to be disclosed, from a plurality of predetermined approval requirements.

3. The system as claimed in claim 1, wherein:
    the collected approval feedback is independently collected according to job titles/status of the predetermined group of members who approved or disapproved of the content.

4. The system as claimed in claim 1, wherein: said collecting part is configured to collect the approval feedback periodically.

5. The system as claimed in claim 1, wherein:
    a disclosure destination to which the content is disclosed and/or a level of importance of the content are selectable from a plurality of predetermined disclosure destinations and/or levels of importance; and
    the approval requirement is determined according to thus selected disclosure destination and/or thus selected level of importance.

6. A method for approving and disclosing content created by a user of an internal network to an external network, comprising:
    distributing the content, via the internal network, to a predetermined group of members, the member tasked with examining the content and determining whether the content should be approved for disclosure;
    collecting approval feedback from an unspecified number of the predetermined group of members as to whether the members approve or disapprove to the content to be disclosed;
    comparing the collected approval feedback with a predetermined approval requirement; and
    disclosing the content to the external network if the collected approval feedback meets the predetermined approval requirement, wherein
    an approval deadline by which the approval requirement must be met is predetermined, and
    in a case that the approval feedback does not meet the approval requirement when the approval deadline comes due, the content is sent back to the user who created the content, a registrant, or a person tasked with approving the content as being disapproving for disclosure to the external network.

7. The method as claimed in claim 6, wherein:
    the predetermined approval requirement is configured as selectable, depending on the content, from a plurality of predetermined approval requirements.

8. The method as claimed in claim 6, wherein:
    the collected approval feedback is independently collected according to job titles/status of the predetermined group of members who approved or disapproved of the content.

9. The method as claimed in claim 6, wherein: the approval feedback is collected periodically.

10. The method as claimed in claim 6, wherein:
    a disclosure destination to which the content is disclosed and/or a level of importance of the content are selectable from a plurality of predetermined disclosure destinations and/or levels of importance; and
    the approval requirement is determined according to thus selected disclosure destination and/or thus selected level of importance.

11. A computer readable storage encoded with a program comprised of commands to make a computer execute respective functions of a plurality of parts for approving and disclosing content created by a user of an internal network to an external network, the plurality of parts comprising: a distributing part distributing the content, via the internal network, to a predetermined group of members, the members tasked with examining the content and determining whether the content should be approved for disclosure;
    a collecting part collecting approval feedback from an unspecified number of the predetermined group of members as to whether the members approve or disapprove of the content to be disclosed;
    a comparing part comparing the collected approval feedback with a predetermined approval requirement; and
    a disclosing part disclosing the content to the external network if the collected approval feedback meets the predetermined approval requirement, wherein an approval deadline by which the approval requirement must be met is predetermined, and in a case that the approval feedback does not meet the approval requirement when the approval deadline comes due, the content is sent back to the user who created the content, registrant, or a person tasked with approving content as being disapproved for disclosure to the external network.

12. The program as claimed in claim 11, wherein: the predetermined approval requirement is configured as selectable, depending on the content, from a plurality of predetermined approval requirements.

13. The program as claimed in claim 11, wherein: the collected approval feedback is independently collected according to job titles/status of the predetermined group of members who approved or disapproved of the content.

14. The program as claimed in claim 11, wherein:
said collecting part is configured to collect the approval feedback periodically.

15. The program as claimed in claim 11, wherein:
a disclosure destination to which the content is disclosed and/or a level of importance of the content are selectable from a plurality of predetermined disclosure destinations and/or levels of importance; and the approval requirement is determined according to thus selected disclosure destination and/or thus selected level of importance.

16. An information storage medium including a software program comprised of commands to make a computer execute respective functions of a plurality of parts for approving and disclosing content created by a user of an internal network to an external network, the plurality of parts comprising:

a distributing part distributing the content, via the internal network, to a predetermined group of members examining the content and determining whether the content should be approved for disclosure;

a collecting part collecting approval feedback from an unspecified number of the predetermined group of members as to whether the members approve or disapprove of the content to be disclosed;

a comparing part comparing the collected approval feedback with a predetermined approval requirement; and a disclosing part disclosing the content to the external network if the collected approval feedback meets the predetermined approval requirement, wherein an approval deadline by which the approval requirement must be met is predetermined, and in a case that the approval feedback does not meet the approval requirement when the approval deadline comes due, the content is sent back to the user who created the content, registrant, or a person tasked with approving the content as being disapproved for disclosure to the external network.

17. The medium as claimed in claim 16, wherein:
the predetermined approval requirement is configured as selectable, depending on the content, from a plurality of predetermined approval requirements.

18. The medium as claimed in claim 16, wherein:
the collected approval feedback is independently collected according to job titles/status of the predetermined group of members who approved or disapproved of the content.

19. The medium as claimed in claim 16, wherein: said collecting part is configured to collect the approval feedback periodically.

20. The medium as claimed in claim 16, wherein:
a disclosure destination to which content is disclosed and/or a level of importance of the content are selectable from a plurality of predetermined disclosure destinations and/or levels of importance; and the approval requirement is determined according to thus selected disclosure destination and/or thus selected level of importance.

21. A computer readable storage medium storing a program causing a computer to approve and disclose content created by a user of an internal network to an external network, comprising:

distributing the content, via the internal network, to a predetermined group of members, the members tasked with examining the content and determining whether the content should be approved for disclosure;

collecting approval feedback from an unspecified number of the predetermined group of members as to whether the members approve or disapprove of the content to be disclosed;

comparing the collected approval feedback with a predetermined approval requirement; and disclosing the content to the external network if the collected approval feedback meets the predetermined approval requirement, wherein an approval deadline by which the approval requirement must be met is predetermined, and in a case that the approval feedback does not meet the approval requirement when the approval deadline comes due, the content is sent back to the user who created the content, a registrant, or a person tasked with approving the content as being disapproved for disclosure to the external network.

22. The system as claimed in claim 1, wherein:
the disclosing part transfers the content to either an in-house folder, a worldwide folder or an in-division folder, depending on the predetermined approval requirement.

23. The method as claimed in claim 6, wherein:
disclosing the content to the external network comprises transferring the content to either an in-house folder, a worldwide folder or an in-division folder, depending on the predetermined approval requirement.

24. The program as claimed in claim 11, wherein:
the disclosing part transfers the information to either an in-house folder, a worldwide folder or an in-division folder, depending on the predetermined approval requirement.

25. The medium as claimed in claim 16, wherein:
the disclosing part transfers the content to either an in-house folder, a worldwide folder or an in-division folder, depending on the predetermined approval requirement.

26. The computer readable recording medium of claim 21, wherein:
disclosing the content to the external network comprises transferring the content to either an in-house folder, a worldwide folder or an in-division folder, depending on the predetermined approval requirement.

* * * * *

UNITED STATES PATENT AND TRADEMARK OFFICE
CERTIFICATE OF CORRECTION

PATENT NO.       : 7,412,485 B2
APPLICATION NO.  : 10/093819
DATED            : August 12, 2008
INVENTOR(S)      : Masaaki Daimon It is certified that error appears in the above-identified patent and that said Letters Patent is hereby corrected as shown below:

Title Page, Column 1 (Title), Lines 1-6, change "INFORMATION PROCESSING SYSTEM, INFORMATION PROCESING METHOD, A SOFTWARE PROGRAM FOR EXECUTING SUCH METHOD, AND INFORMATION STORAGE MEDIUM COMPRISING SUCH SOFTWARE PROGRAM" to --SYSTEM, METHOD, AND PROGRAM FOR EXAMINING AND DISCLOSING CONTENTS OF INTERNAL NETWORK, AND RECORDING MEDIUM FOR SUCH PROGRAM--.

Column 1, Lines 1-6, change "INFORMATION PROCESSING SYSTEM, INFORMATION PROCESING METHOD, A SOFTWARE PROGRAM FOR EXECUTING SUCH METHOD, AND INFORMATION STORAGE MEDIUM COMPRISING SUCH SOFTWARE PROGRAM" to --SYSTEM, METHOD, AND PROGRAM FOR EXAMINING AND DISCLOSING CONTENTS OF INTERNAL NETWORK, AND RECORDING MEDIUM FOR SUCH PROGRAM--.

Column 11, Line 27, change "contents" to --content--.

Column 12, Line 10, change "member" to --members--.

Column 12, Line 15, after "disapprove" change "to" to --of--.

Column 12, Line 28, change "disapproving" to --disapproved--.

Signed and Sealed this

Seventeenth Day of February, 2009

JOHN DOLL
*Acting Director of the United States Patent and Trademark Office*